June 26, 1923.
L. P. HYNES
1,459,829
WATERPROOF ELECTRIC HEATER AND ITS METHOD OF MANUFACTURE
Filed Oct. 18, 1921
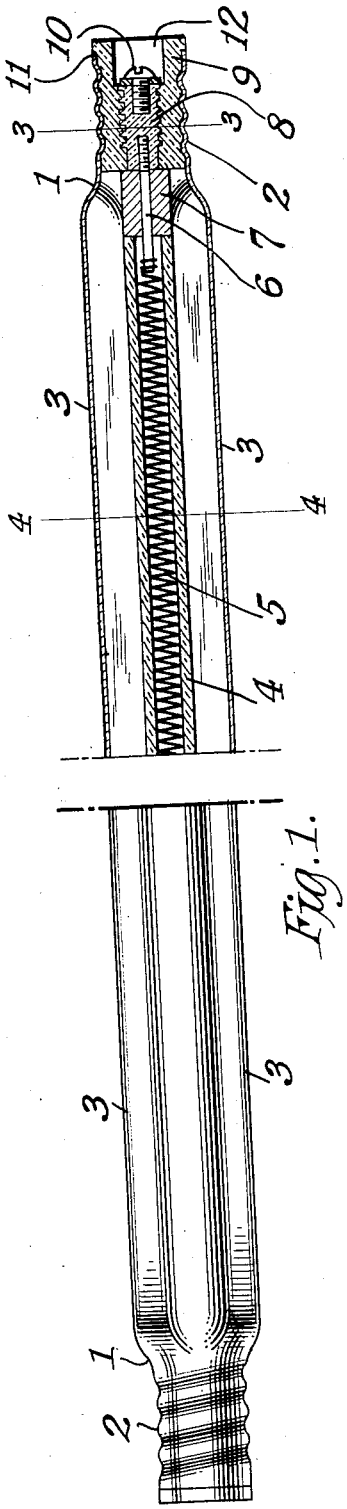
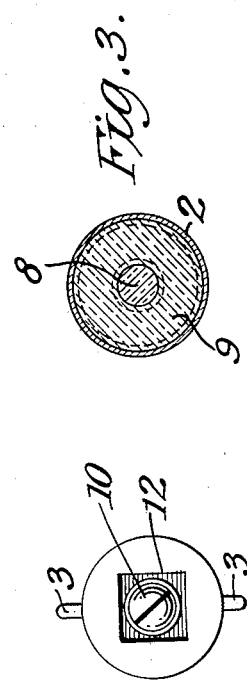
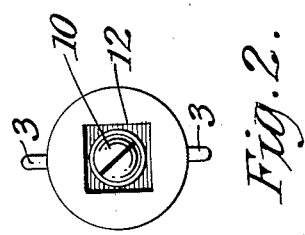
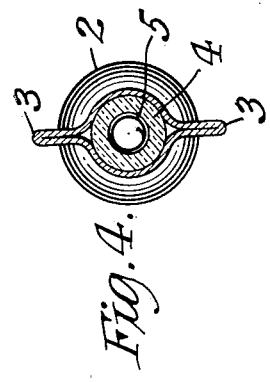
INVENTOR
Lee P Hynes
BY
E. M. Bentley
ATTORNEY Patented June 26, 1923.

1,459,829

UNITED STATES PATENT OFFICE.

LEE P. HYNES, OF ALBANY, NEW YORK, ASSIGNOR TO CONSOLIDATED CAR-HEATING COMPANY, OF ALBANY, NEW YORK, A CORPORATION OF WEST VIRGINIA.

WATERPROOF ELECTRIC HEATER AND ITS METHOD OF MANUFACTURE.

Application filed October 18, 1921. Serial No. 508,549.

*To all whom it may concern:*

Be it known that I, LEE P. HYNES, a citizen of the United States, residing at Albany, in the county of Albany and State of New York, have invented certain new and useful Improvements in Waterproof Electric Heaters and Their Methods of Manufacture, the following being a full, clear, and exact disclosure of the one form of my invention which I at present deem preferable.

For a detailed description of the present form of my invention, reference may be had to the following specification and to the accompanying drawings forming a part thereof, wherein—

Fig. 1 is a side elevation of my device partly in section and

Fig. 2 is an end view thereof.

Figures 3 and 4 are sectional views taken on lines 3—3 and 4—4, respectively, Figure 1.

My invention relates to a waterproof electric heater for heating air or gases as well as liquids, or solids. It comprises an external metallic shell of steel or other suitable metal which is shaped by pressing a tube into a smaller coil-containing tube with outside radiating ribs or flanges produced by the surplus metals, and at each end has a screw thread formed thereon by which the end seals and terminal connectors may be applied. The ribs or flanges will be of a double thickness of sheet metal.

Referring to the drawing 1 represents a steel tube which was originally of plain cylindrical form, but which for the greater part of its length has been compressed laterally until it has assumed the form of a smaller central tube of about half the original diameter with two flat flanges projecting radially therefrom and 180 degrees apart. These flanges are shown at 3, 3 and are formed by the surplus metal of the original tube over what is required for the smaller tube. The two ends of the tube are left of the original size and have a screw thread rolled or pressed into them. Inside the central tube is extended a tubular lining 4 of refractory insulating material and inside of this lining is the heating coil 5. The lining should closely fit the inside of the tube although it may be free enough to be pushed into it. The closer it fits the more efficient will be the transmission of heat to the tube and the less will be the danger of breakage of the insulation. To each end of the coil is attached a stem 6 which passes through an insulating bushing 7 and is screwed into a metallic insert 8 which is screwed into a larger bushing 9 that, in turn, is screwed into the end of the original tube. Bushing 9 has a deep square countersink at its outer end and a shoulder that overlies the end of said tube. A connecting screw 10 is driven into the aforesaid insert 8 and serves as the terminal screw for one end of the heating coil. The mode of assembling the described parts is as follows: Assuming that lining 4 is in place in the central tube, the coil 5 with a stem 6 secured to each end has the bushing 7 slipped over stem 6 at one end, and the stem then screwed into the insert 8 in bushing 9. The coil can then be threaded into lining 4 and the bushing 9 firmly screwed into the main tube by means of a socket wrench fitting into the square countersink. That will complete the assembling at one end of the heater leaving the opposite end with the opposite stem 6 protruding from the lining. Since the heater coil is flexible its end may be drawn out of the lining tube far enough to permit the bushing 7 being slipped over this stem 6 and the stem screwed into the insert 8 by means of small pliers or by a wrench engaging a flat or hexagonal section on the stem. It then remains to insert bushing 9, which may be done by screwing the insert 8 back into bushing 8 thereby putting a temporary twist in coil 5. This twist will be relieved as the bushing 9 is finally screwed into the main tube, but will be permissible by reason of the flexibility and numerous turns of the heating coil. By a reverse series of steps the coil may be removed and replaced, if desired, by a new coil, this being possible by the fact that the coil is free from any internal engagement with the lining which would obstruct its passage and the passage of the terminal stems 6 which are secured to the coil before its insertion and go with it to make up a separate unitary member.

The construction above described constitutes a waterproof heater of a substantial rugged character with adequate radiating surfaces. Moreover, additional wings may be formed on the tube by pressure to secure any desired area of radiating surface. The shaping of the external metal by pressure avoids the need of joints therein requiring to be made watertight by riveting or soldering. It is also strong and cheap to make.

What I claim as new and desire to secure by Letters Patent is:

1. The mode of manufacturing an electric heater which consists in shaping a metallic shell by pressing a tube into the desired form and inserting therein a heating conductor with insulation and connecting terminals.

2. The mode of manufacturing an electric heater which consists in shaping an external metallic shell by pressing a tube into ribbed form and inserting therein a heating conductor with insulations and connecting terminals.

3. The mode of manufacturing an electric heater which consists in shaping an external metallic shell by pressing a tube into ribbed form with screw ends and inserting therein a heating conductor with insulation and connecting terminals.

4. The mode of manufacturing an electric heater which consists in shaping an external shell into a tubular form with doubled radiating ribs and inserting therein a heating conductor with insulation and connecting terminals.

5. The mode of manufacturing an electric heater which consists in forming an external shell by compressing a metal tube into a tube of smaller dimensions with outside ribs and inserting in the receptacle thus formed a heating conductor with insulation and connecting terminals.

6. The mode of manufacturing an electric heater which consists in reducing by pressure a metallic tube to form internal seating portions thereon for the heating conductor, and inserting therein on the said seating portions an insulated heating conductor with connecting terminals.

7. The mode of manufacturing an electric heater which consists in shaping by pressure a sheet metal shell into a tubular ribbed form, inserting therein an insulating lining, threading therethrough within the lining a heating conductor, and closing the ends of the shell by insulating bushings through which the connecting terminals extend.

8. An electric heater comprising a pressed metal shell in the form of a ribbed tube, insulation seated in said tube, a heating conductor within the tube, insulating bushings closing the ends of the tube and connecting terminals for said conductor extended through said bushings.

9. An electric heater comprising a pressed metal shell in the form of a ribbed tube with screw-threaded ends, an insulated heating conductor within said shell, screw bushings in the ends of the shell and connecting terminals for the said conductor passing through said bushings.

10. An electric heater comprising a tubular metal shell with external ribs, an insulated heating conductor extending longitudinally through said shell, insulating bushings closing the ends of the shell and connecting terminals for said conductor passing through said bushings.

11. A pressed metal shell for an electric heater formed with an external rib of a double layer of metal.

12. A pressed metal shell for an electric heater shaped as a seamless tube with external ribs formed of a double layer of metal.

13. An electric heater comprising a sheet metal shell formed as a tube with external ribs, an insulated heater conductor in said tube, an end bushing containing a metal block, a stem passing through the bushing and connecting said bushing with one end of said conductor and an external connector for said block.

14. An electric heater comprising a sheet metal shell with screw ends, an insulated heating conductor in said shell, seating bushings screwed into the ends of the shell and connecting terminals passing through said bushings.

15. An electric heater comprising a metallic shell, a refractory lining therefor closely fitting the shell, and a heating coil freely insertable in said lining with the lining in place in the shell.

16. An electric heater comprising a metallic shell, a refractory lining therefor closely fitting the shell, and a heating coil extending through said lining, and free thereof internally.

17. An electric heater comprising a metallic shell, a refractory lining therefor of tubular form, and a heating coil having a terminal attached thereto smaller than the internal dimension of said lining, whereby both coil and terminal may be passed therethrough.

18. An electric heater comprising a sheet metal shell, a tubular lining therefor in close contact therewith, and a removable heating coil extending through said lining.

19. An electric heater comprising a metallic shell, a tubular refractory lining in close contact therewith, a removable heating coil extending through said lining, end bushings, and attachment terminals for the external circuit located in recesses in the said bushings.

20. An electric heater comprising a pressed metal shell having integral ribs and tubular ends, a refractory tubular lining of less diameter than the ends, a heating coil extending freely through said lining with end connectors, and insulating bushings in said tubular ends perforated for the passage of said connectors.

21. An electric heater having a pressed metal shell, a tubular refractory lining in close contact with said shell, a removable heating coil in said lining having rigid stems connected to its respective ends, insulating bushings in said shell, metallic inserts in said bushings connecting with the respective stems, and externally accessible binding devices on said inserts for receiving the external circuit wires.

22. An electric heater comprising a tubular metallic shell having its central portion formed into a smaller tube with ribs, its ends being shaped as larger tubes, a refractory lining fitting the smaller tube, a removable heating coil extending through said lining, perforated insulating bushings in the larger ends, and connecting devices for the respective ends of said coil passing through said bushings.

23. An electric heater comprising a pressed metallic shell having its central part formed as a tube having extending ribs and its ends formed as larger tubes but of less diameter than the said ribs, a refractory lining fitted into the central tube, insulating bushings in the larger end tubes, and rigid connecting devices for the respective ends of the heating coil passing through said bushings.

Signed at Albany, county of Albany, State of New York, this 14th day of October, 1921.

LEE P. HYNES.